Figure 1:
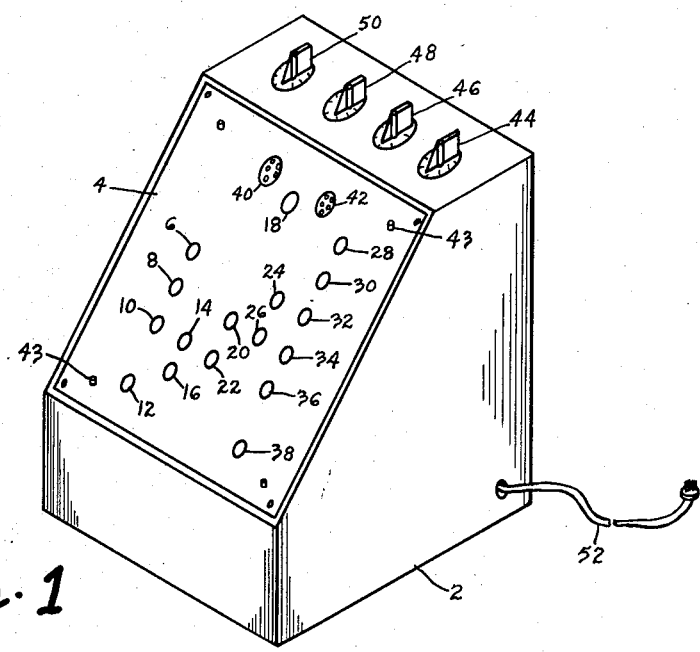

June 17, 1958  S. S. FINKEL  2,838,849
PORTABLE VACUUM TUBE CHARACTERISTIC DEMONSTRATOR
Filed March 19, 1954  3 Sheets-Sheet 1

INVENTOR
SEYMOUR S. FINKEL
BY
ATTORNEYS

June 17, 1958 S. S. FINKEL 2,838,849
PORTABLE VACUUM TUBE CHARACTERISTIC DEMONSTRATOR
Filed March 19, 1954 3 Sheets-Sheet 2
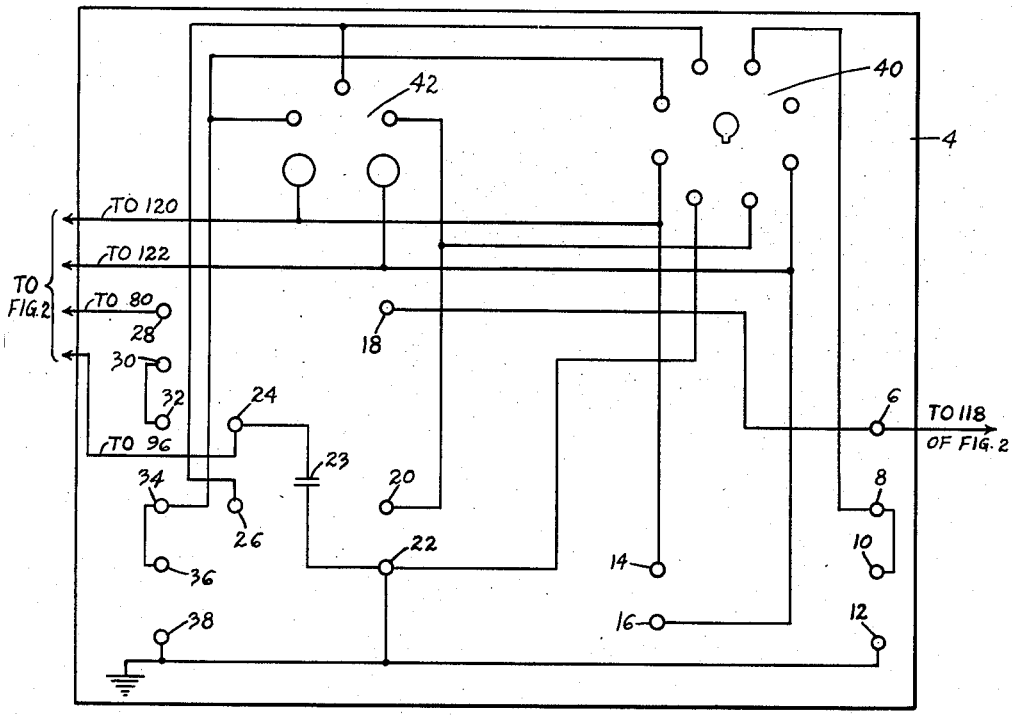
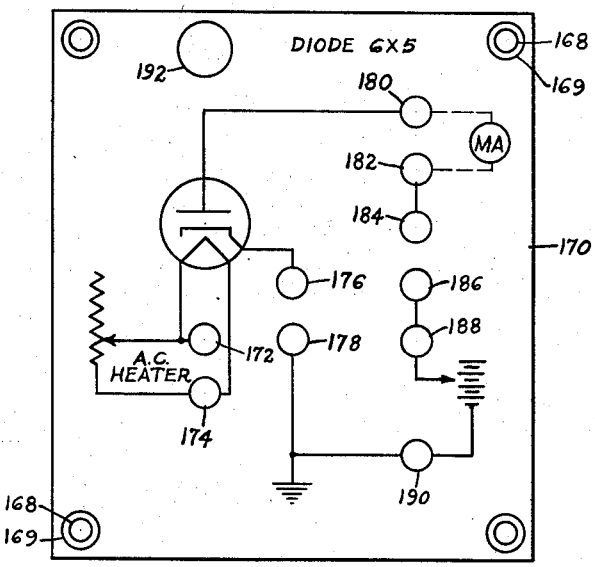
INVENTOR
SEYMOUR S. FINKEL
ATTORNEYS June 17, 1958 S. S. FINKEL 2,838,849
PORTABLE VACUUM TUBE CHARACTERISTIC DEMONSTRATOR
Filed March 19, 1954 3 Sheets-Sheet 3

INVENTOR
SEYMOUR S. FINKEL
BY
ATTORNEYS

United States Patent Office 2,838,849
Patented June 17, 1958

2,838,849

PORTABLE VACUUM TUBE CHARACTERISTIC DEMONSTRATOR

Seymour S. Finkel, Brooklyn, N. Y., assignor to the United States of America as represented by the Secretary of the Navy Application March 19, 1954, Serial No. 417,525

4 Claims. (Cl. 35—19)

(Granted under Title 35, U. S. Code (1952), sec. 266)

The invention described herein may be manufactured and used by or for the Government of the United States of America for governmental purposes without the payment of any royalties thereon or therefor.

This invention relates in general to educational devices and more particularly to a device that illustrates schematically the elements of electron vacuum tubes and demonstrates by means of meters the static and dynamic tube characteristics.

Presently the electronic vacuum tube is being used in ever increasing numbers in widely divergent types of machinery and equipment. To design, build, and repair electronic equipment it is necessary that the characteristics and operating principles of said vacuum tubes be fully understood.

The prevailing method of demonstrating and teaching the operation of vacuum tubes and illustrating the static and dynamic characteristics of said tubes consists of assembling the various required components on a wood board of some convenient size. The wood board is commonly known as a bread board and contains a vacuum tube socket that is connected to the necessary auxiliary equipment such as resistors, terminals, a power supply to generate the plate voltage, bias voltage and filament voltage, and the connecting electrical conducting wires. The tube that is being demonstrated is inserted into the socket and is subjected to voltage potentials of the proper polarity and magnitude. Resistors of the proper size are soldered or connected by any convenient means into the circuit. The various voltages and currents of the vacuum tube are recorded and then plotted on graph paper.

The utilization of a bread board type of circuit arrangement to demonstrate the characteristics of a vacuum tube is very ineffective for training purposes. There is a confusion of elements and wires, and extreme difficulty in tracing the circuit and the connections between the various elements of the vacuum tube and the external components. The bread board method of demonstration is expensive, time consuming in that the instructor must set up a new bread board for each type of demonstration, and the visual presentation of the circuitry involved is confusing, misleading and difficult to trace.

The present invention comprises a power supply that generates the necessary plate voltage, screen voltage, bias and filament voltage preferably from a one hundred and fifteen volt A. C. source. A nonconducting panel contains a plurality of vacuum tube sockets and a plurality of discretely placed terminals or contacts wherein said terminals and said tube sockets are interconnected to each other and to the outputs of the power supply. A non-conducting card that contains a schematic diagram of a particular type of vacuum tube, the circuitry that is required to obtain the vacuum tube characteristics, and containing an appropriate number of discretely placed holes, is placed over the panel. By means of the card, a particular pattern of terminals and a vacuum tube socket of the panel, are exposed. A vacuum tube that is of the type illustrated schematically on the card is inserted into the tube socket. The exposed terminals are utilized to conveniently connect electrical components and shorting bars into the illustrated circuit and are also utilized to obtain the required voltage and current readings.

This device thus illustrates, in bold illustrations, the circuit of a vacuum tube and its associated components. The voltage and current readings are taken from terminals that are realistically positioned with respect to the illustrated schematic. The addition of an external component of a resistor, shorting bar, and the like are accurate and actively affect the results that are obtained. The type of vacuum tube that is illustrated can be readily altered by replacing one card with another and inserting the indicated vacuum tube and the necessary external components into the exposed terminals and socket.

The plate, screen, bias, and heater voltages are controlled by the instructor by means of four independently operated, conveniently located, potentiometers. The unit is prewired in a "universal" manner to accommodate the plurality of vacuum tubes that are to be illustrated. Thus, the instructor has at all times an accurately wired, easily understood and effective vacuum tube characteristic demonstrator.

It is an object of this invention to provide a device that will aid in the demonstration of the characteristics of vacuum tubes.

Another object is to provide a device that illustrates boldly and clearly a schematic of the vacuum tube that is being demonstrated and the external circuitry that is required.

An additional object is to provide a vacuum tube characteristic demonstrator that is prewired in a universal manner to accommodate and demonstrate a variety of different types of vacuum tubes.

A further object is to provide a device that can accommodate a variety of externally connected components and connectors that are superimposed upon the schematic diagram and coact with the actual circuit being utilized.

Figure 2:
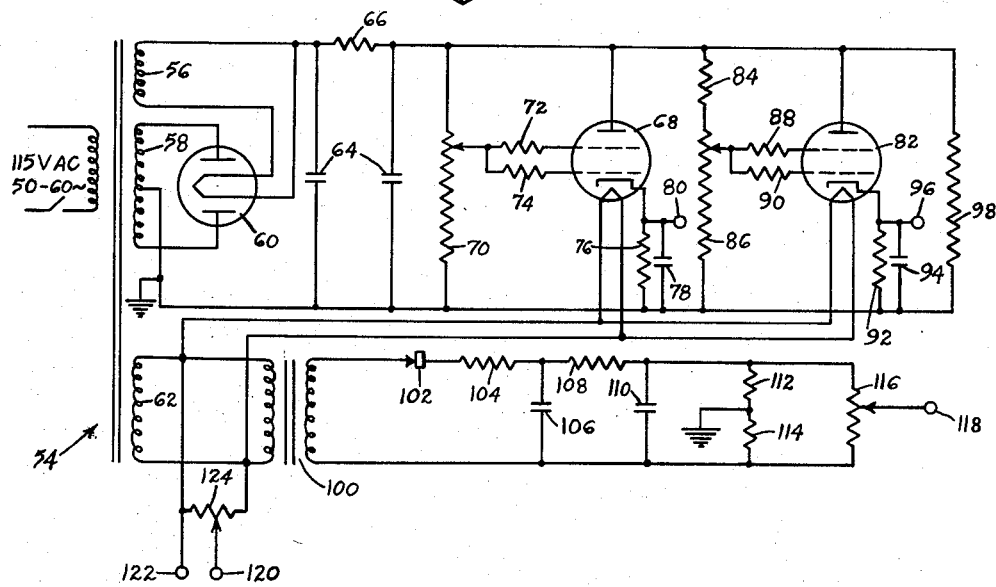
Figure 4:
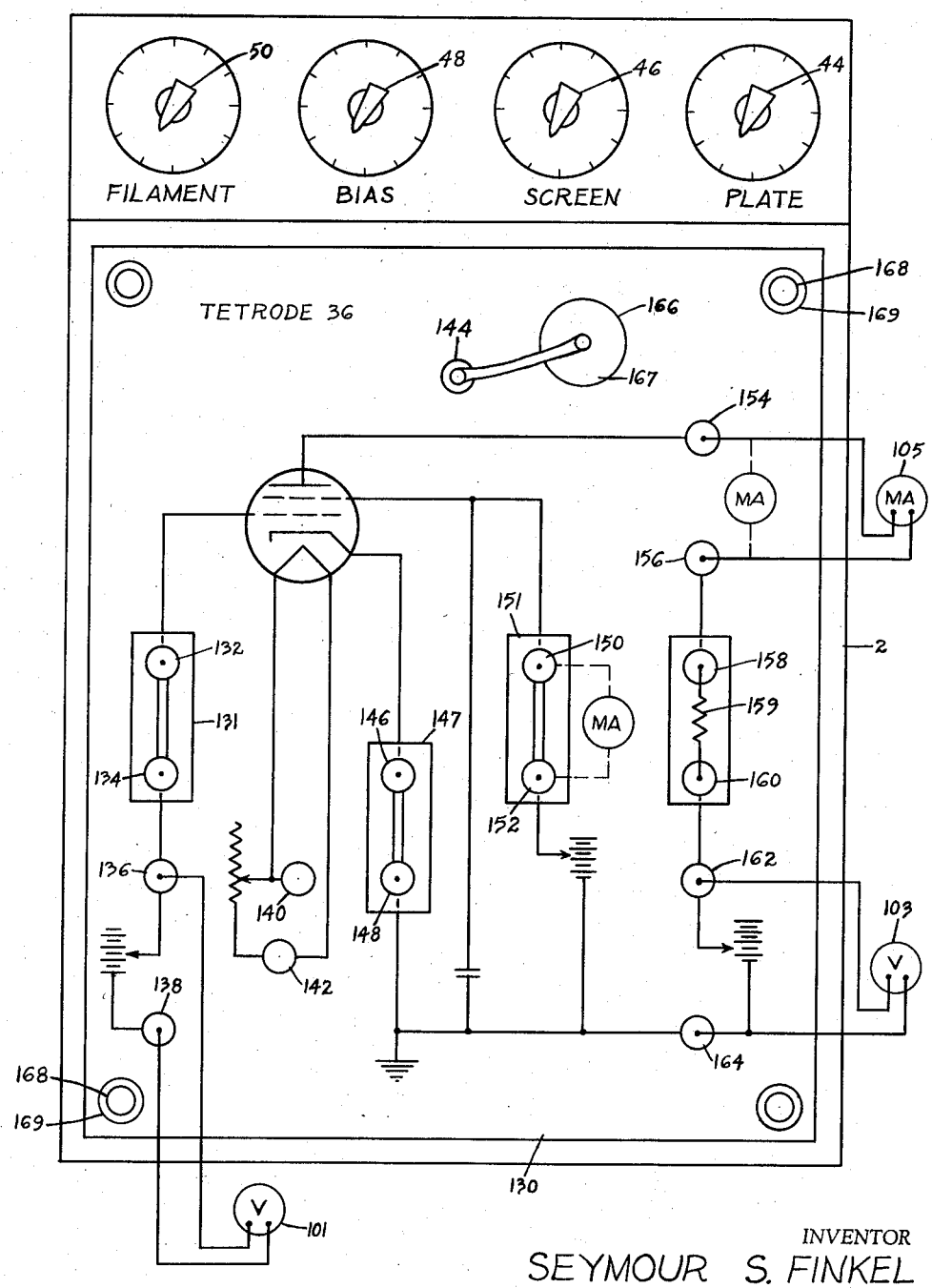

Other objects and many of the attendant advantages of this invention will be readily appreciated as the same becomes better understood by reference to the following detailed description when considered in connection with the accompanying drawings wherein:

Fig. 1 is a perspective of the invention illustrating the box with a prewired front panel containing two vacuum tube sockets, a plurality of female plugs or contacts and the voltage control potentiometer knobs, Fig. 2 is a wiring diagram of the power supply located within the box, illustrating the components and locations of the contacts for the plate, screen, bias and filament voltages, Fig. 3 is the wiring diagram of the under face of the prewired panel looking up from the bottom showing the connections between the vacuum tube sockets, and the terminals; and their connections to the power supply, Fig. 4 shows the panel with a card in place, the card being of the type used to demonstrate the type 36 tetrode vacuum tube in position and connected for a demonstration, and Fig. 5 is a reproduction of the face of the card that is utilized to demonstrate the type 6X5 diode vacuum tube.

Referring to Fig. 1 therein is shown a box 2 that is self-contained in that it contains all the necessary circuitry.

A prewired panel 4 is mounted by an convenient means such as screws, nails or the like, to the box 2. The panel 4 possesses good electrical insulating properties and contains a particular pattern of a plurality of terminals 6 to 38 inclusively, two vacuum tube sockets 40 and 42, and four aligning pins 43. The tube socket 40 accommodates a vacuum tube having eight prongs while the tube socket 42 accommodates vacuum tubes having five prongs. Conveniently located on the top of said box 2 are four potentiometer adjusting knobs 44, 46, 48 and 50. Said knobs are utilized to adjust the plate, screen, bias and filament voltages that are applied to the vacuum tube. A standard male plug and electric cord 52 supply one hundred and fifteen volts A. C. to the power supply that is located within the box 2.

Referring to Fig. 2, therein is shown a schematic diagram of the power supply. Said power supply generates the four basic voltages that are required for the demonstration. The four voltages that are generated are known as the plate, screen, bias and filament voltages. The one hundred and fifteen volt A. C. input is fed into an input transformer 54 that contains one primary winding and three secondary windings. The secondary windings 56 and 58 are connected to the full wave vacuum tube rectifier 60. The remaining secondary coil 62 supplies the six and three tenths volts for the filaments of the power supply and the tube that is being demonstrated. The filament voltage for the tube that is being demonstrated appears at the terminals 120 and 122 and is controlled by the two hundred and fifty ohm, twenty-five watt, potentiometer 124. The full wave rectifier 60 is of the type 5Y3 vacuum tube. The pulsating D. C. is subjected to a smoothing filter network that comprises a pair of twenty mfd. condenser 64 and a one thousand ohm, ten watt, resistor 66. The rectified D. C. voltage is then inserted into the vacuum tube 68 through the one hundred thousand ohm, four watt, potentiometer 70 and the resistive network 72 and 74 of one hundred ohms and five million ohms respectively. The plate voltage of approximately three hundred volts is generated across a parallel resistive, capacitive network 76 and 78 of one million ohms and 20 mfd., respectively. Said network is in series with the cathode of the 6Y6 type tube 68. The plate voltage is taken from the terminal 80 and ground. A second 6Y6 type tube 82 is utilized to generate the screen voltage and is connected in parallel with the tube 68. The voltages on the grids of said tube 82 are determined by the combination of resistors 84, 86, 88 and 90 that have the value of eighteen thousand ohms, one hundred thousand ohms, four watts, one hundred ohms, and five million ohms, respectively. The screen voltage of approximately 250 volts is generated across a parallel resistive-capacitive network 92 and 94 having the values of five million ohms and 20 mfd., respectively. Said RC network is in series with the cathode of the 6Y6 type tube 82. The screen voltage is taken from the terminal 96 and ground. A terminating forty-seven thousand ohm, two watt resistor 98 is connected across the tubes 68 and 82.

The primary of a step-up transformer 100 is connected to the filament winding 62 and performs as an isolation transformer, thus preventing any change of the generated plate or screen voltages being reflected into and influencing the generated bias voltage. The output of the transformer 100 is rectified to D. C. by means of the half wave rectifier 102 and the filter network comprising the four hundred and seventy ohm resistor 104, the twenty mfd. condenser 106, the twenty-two ohm resistor 108 and the twenty mfd. condenser 110. The output of the filter is fed into a series resistive network 112 and 114 of thirty-three thousand ohms and sixty-eight thousand ohms, respectively. The junction of said two resistors is grounded. A ten thousand ohm, two watt, potentiometer 116 is connected across said last mentioned resistive network and is used to control the bias voltage. The bias voltage appears across the terminal 118 and ground.

Referring to Fig. 3, therein is shown the wiring connections between the vacuum tube sockets and the female jacks as they appear on the underside of the prewired card. The wiring connections between the prewired card and the power supply are also shown. Said prewired panel 4 contains a plurality of terminals that are arranged to form a specific distinctive pattern as illustrated by Fig. 3. The vacuum tube sockets are placed side by side at the top of the panel 4. These terminals and sockets align with apertures in various cards 130.

The pin 1 of tube 42 is connected to the terminal 120 of the power supply and to the pin 2 of the tube 40. The pin 5 of the tube 42 is connected to the terminal 122 of the power supply and to the pin 7 of the tube 40.

The pin 2 of socket 40 is connected to the terminal 14 and the pin 7 of socket 40 is connected to the terminal 16. The pin 4 of socket 42 is connected to the pin 8 of the socket 40 and each of said last mentioned pins is connected to the terminal 20. The terminal 30 is connected to the terminal 32, terminal 34 is connected to terminal 36, and terminal 8 is connected to terminal 10. The terminal 34, pin 2 of socket 42 and pin 3 of socket 40 are electrically interconnected. The terminal 26, pin 3 of tube 42, and pin 4 of tube 40 are electrically connected together. The pin 5 of socket 40 is connected to the terminal 8. The pin 1 of socket 40, and the terminals 22, 12 and 38 are electrically connected together and to the ground of the power supply. The terminal 22 is connected to terminal 24 through condenser 23. The terminal 118 of the power supply is connected to the terminals 6 and 18. The terminals 80 and 96 of the power supply are connected to the terminals 28 and 24, respectively of the panel 4. The panel 4 is secured to the box 2 and need never be removed except for repairs.

The knobs 44, 46, 48 and 50 are connected to control the potentiometers 86, 70, 116 and 124 respectively.

Fig. 4 illustrates the overlay card that is utilized to demonstrate the characteristics of the tetrode 36 type vacuum tube in the demonstration position over the prewired panel 4. The card 130 contains a schematic diagram of the vacuum tube showing the internal elements of the tube, and the circuitry that is required and is placed over the prewired panel 4. The schematic diagram is printed on the non-conducting card 130 in bold lines. Located at specific locations on said card 130 are a plurality of holes that correspond with, and expose a discrete plurality of the terminals that are located in the prewired panel 4. Said holes are located so that they intersect the printed schematic circuit at the required check points. Thus the holes 132 through 164 expose the terminals 6 through 38 respectively of the prewired panel 4. Another hole 166 exposes and permits access to the tube socket 42. Thus, by means of the overlay card 130 containing the illustrated circuit and the holes that are discretely placed to interrupt said printed schematic, the location of each contact with respect to the actual circuit, and the information that is obtained at each jack is quickly ascertained. A plurality of shorting bars such as 131, 147 and 151 and resistors such as 159 are utilized to properly connect and load the vacuum tube. These units may be of any desired removable plug-in type construction, such as bars or resistors mounted on rectangular insulating bases with downwardly projecting plugs to be inserted through the card apertures. A plurality of holes 168 formed by eyelets 169 accommodate the pins 43 on the prewired panel 4 to accurately position and retain said card 130 relative to the panel 4. The contact 18 is accessible through hole 144 to accommodate a plug for connecting the top or grid connection of the tube 167.

Fig. 5 illustrates the overlay card that is utilized to demonstrate the characteristics of the type 6X5 vacuum tube. Said overlay card 170 contains an illustrated schematic diagram of the test circuit that is interrupted by means of a plurality of discretely positioned holes 172 through 190. Said holes expose the plurality of female jacks 14, 16, 20, 22, 28, 30, 32, 34, 36 and 38 respectively of panel 4 that are necessary to obtain the required information. An additional opening 192 exposes the vacuum tube socket 40, thus selecting the correct tube socket for the tube type 6X5.

In the operation of this device, it shall be assumed that the characteristics of the vacuum tube type 36 are to be taught. Returning to Fig. 4 the plate, screen, bias and filament voltage control knobs 44, 46, 48 and 50 are set to zero or minimum values. The overlay card 130 is then positioned over the prewired panel 4. The tetrode 36 type vacuum tube 167 is inserted into the socket 42 through the opening 166. Shorted inserts 131, 147 and 151 are then inserted into the terminals 6 and 8, 20 and 22, and 24 and 26, through the holes 132 and 134, 146 and 148, and 150 and 152, respectively. A plate resistor 159 is connected to the terminals 32 and 34 through the holes 158 and 160. Voltmeters 101 and 103 are then connected to the terminals 10 and 12, and 36 and 38 through the holes 136 and 138, and 162 and 164 respectively. A milliammeter 105 is connected to the terminals 28 and 30 through the holes 154 and 160. The filament and screen-grid voltages are set to six volts and ninety volts respectively. The bias voltage as indicated by meter 101 is set to zero. The plate voltage as indicated by meter 103 is varied in convenient steps from zero to two hundred and fifty volts. At each step the plate current is noted on meter 105 and plotted on a graph. In this manner the curve of plate current vs. plate voltage is obtained when there is zero bias and ninety volts on the screen.

The bias voltage is varied from zero to minus six volts in one volt steps to obtain the family of vacuum tube characteristic curves.

In a similar manner the characteristic curves of the type 6X5, 6C5 and 6V6 vacuum tubes are obtained. The cards that are utilized to demonstrate the vacuum tubes type 6C5 and 6V6 are not shown nor illustrated. Said omitted cards are similar to the illustrated cards except for changes in the circuit design and the pattern of holes.

Obviously many modifications and variations of the present invention are possible in the light of the above teachings. It is therefore to be understood that within the scope of the appended claims the invention may be practiced otherwise than as specifically described.

What is claimed is:

1. A vacuum tube demonstrator comprising a power supply having a plurality of voltage taps, a panel capping said power supply, a plurality of means to vary voltages supplied by said taps, said means being mounted on said panel, a plurality of vacuum tube sockets and a plurality of jacks carried by said panel, selected jacks being prewired to selected terminals of said tube sockets, selected jacks each being positioned proximate the periphery of said panel and being prewired to selected taps through selected voltage varying means, an overlay card mounted removably on said panel, said card having a first opening revealing one only of said tube sockets, further openings revealing some of said jacks and an incomplete circuit diagram containing a schematic representation of the electrodes of a vacuum tube and of wiring connections from the electrodes to said revealed jacks, said represented wiring connections duplicating the prewiring between said revealed jacks and the terminals of said revealed tube socket, whereby circuit components, shorting links and meters may be connected between said revealed jacks so as to complete said circuit diagram and form a circuit by means of which the electrical characteristics of a vacuum tube of the represented type may be determined upon its insertion in the revealed tube socket.

2. A vacuum tube demonstrator comprising: a power supply having a plurality of voltage taps; a panel capping said power supply, said panel mounting a plurality of vacuum tube sockets, a plurality of jacks each prewired to at least one terminal of one of said tube sockets, and a plurality of jacks each prewired to at least one tap on said power supply; and an overlay card removably mounted on said panel, said card having a first opening revealing one only of said tube sockets, further openings revealing some of said jacks and an incomplete circuit diagram containing the schematic representation of the electrodes of a vacuum tube and of wiring connections from the electrodes to said revealed jacks, said represented wiring connections duplicating the prefiring between said revealed jacks and the terminals of said revealed tube socket, whereby circuit components, shorting links and meters may be connected between said revealed jacks so as to complete said circuit diagram and form a circuit by means of which the electrical characteristics of a vacuum tube of the represented type may be determined upon its insertion in the revealed tube socket.

3. A device as set forth in claim 2, including a plurality of means for varying the voltage supplied to said taps.

4. A vacuum tube demonstrator comprising, in combination: a power supply having a plurality of voltage taps; a panel for said power supply, said panel mounting a plurality of vacuum tube sockets and a plurality of electrical connection means and having electrical wiring connections between the terminals of said tube sockets and said connection means, the wiring connections being in accordance with predetermined circuits for testing the characteristics of certain predetermined vacuum tubes; and an overlay card having a first opening revealing one of said tube sockets, other openings revealing a plurality of said connection means and a pictorial representation showing the electrodes of a vacuum tube and wiring connections between said represented electrodes and said revealed connection means, said represented wiring connections corresponding to the existing wiring connections between the terminals of said revealed tube socket and said revealed connection means, so that by connecting the proper circuit components, shorting links and meters between said revealed connection means, the electrical characteristics of a tube of the represented type may be determined upon its insertion in the revealed tube socket.

References Cited in the file of this patent

UNITED STATES PATENTS

| | | |
|---|---|---|
| 2,568,535 | Ballard | Sept. 18, 1951 |
| 2,592,552 | De Florez et al. | Apr. 15, 1952 |

OTHER REFERENCES

Kepco Labs. Inc. advertisements published in Review of Scientific Instruments for February 1948, page XXI, and for November 1948, page XII.